UNITED STATES PATENT OFFICE.

EMILE SCHLOESING AND EMILE HENRI SCHLOESING, OF MARSEILLES, FRANCE.

INSECTICIDE.

SPECIFICATION forming part of Letters Patent No. 498,819, dated June 6, 1893.

Application filed December 21, 1892. Serial No. 455,922. (No specimens.)

*To all whom it may concern:*

Be it known that we, EMILE SCHLOESING and EMILE HENRI SCHLOESING, citizens of France, residing at Marseilles, have invented a certain new and useful Improvement in Insecticides and Anti-Cryptogamic Treatment of Plants; and we do hereby declare the following to be a full, clear, and exact description of the invention, such as will enable others skilled in the art to which it appertains to make and use the same.

Our invention has relation to the production of a compound for use as an insecticide and anticryptogamic specific, for the treatment of plants.

The principal objects of our invention are first, to provide a comparatively inexpensive and effective specific or compound in a dry state or condition for preserving plants against the destroying influence or tendencies of insects and cryptogamic diseases; and second, to provide a compound for use as an insecticide or anticryptogamic specific for the treatment of plants.

Our invention consists of a compound for use as an insecticide and anticryptogamic specific for the treatment of plants composed of purifying matter from gas works, freed from cyanides, with the addition or admixture therewith of sulphate of copper and tobacco in a liquid or dry state or condition.

Our invention further consists of a compound for use as an insecticide and anticryptogamic specific composed of the purifying matters of gas works, freed from cyanides, with the addition or admixture of tobacco in a liquid state or condition.

Our invention further consists of a specific or compound produced in substantially the manner hereinafter described and claimed.

The nature, general features and scope of our invention will be more fully understood from the following description thereof.

In carrying our invention into practice use is made of the purifying matter from gas works known as "spent oxide" or "Laming (Lamy's) mixture" and consisting of the following ingredients: first, free sulphur in a precipitate state; second, sulphate and carbonate of lime; third, oxide of iron; fourth, sulphocyanide of ammonia; fifth, ferro-cyanide of iron (Prussian blue). However, before using this "spent oxide" the cyanides are removed and collected by washing the mass with water, and the Prussian blue is taken up by washing the mass with a solution of alkaline lyes. Use is also made of sulphate of copper, which is a very strong anticryptogamic. However, sulphate of iron may be employed in lieu thereof, and use is also made of the liquid or juice which has been employed as a bath in which to dip tobacco leaves before the same are manufactured into cigars.

For the production of a batch of the compound or specific a certain quantity of the said purifying matters of gas works, freed from cyanides as set forth with or without, according to circumstances, sulphate of copper or a sulphate of iron is taken, and there is mixed or added thereto tobacco in preferably a liquid state or condition as described, in the proportions of one to five per cent, more or less, according to its degree of concentration in the admixture with the purifying matters from the gas works, forming the base of the compound or specific, freed from cyanides. The mass or admixture is then after being thoroughly mixed or compounded dried at preferably a low heat and triturated so as to bring the same to a very fine state for use or it may be reduced to a pulverized mass or condition for the uses as explained. The tobacco in a powdered instead of a liquid state or condition may be used with the other ingredients with good results, but preference is given to the use thereof in a liquid form with the other substance or materials, because the same admits of greater division and more intimate action on the plants subjected to a treatment therewith. In either case the powdered or triturated mass is applied by means of a blast to the plants to be preserved or freed from insects.

Hitherto, the purifying matters of gas works have been suggested, as being adapted for use as an insecticide and as an anticryptogamic specific for the treatment of plants, but as far as we are aware tobacco in either a liquid or powdered state has not been used in connection with such matters for any such purpose.

In this connection in the extended practice of our invention we have found that the tobacco appreciably enhances the effective action of the compound or specific on plants and gives results which it was not thought possible could be obtained.

Having thus described the nature and objects of our invention, what we claim as new, and desire to secure by Letters Patent, is—

1. A compound for use as an insecticide and anticryptogamic specific composed of the purifying matter of gas works designated spent oxide or Laming mixture freed from cyanides, with the addition thereto of sulphate of copper and tobacco, substantially as and for the purposes set forth.

2. A compound for use as an insecticide and anticryptogamic specific composed of spent oxide or Laming mixture freed from cyanides, and tobacco, substantially as and for the purposes set forth.

In testimony whereof we affix our signatures in presence of two witnesses.

EMILE SCHLOESING.
  EMILE HENRI SCHLOESING.

Witnesses:
 D. GENORDEAL,
 J. THORNTON RICKMAN.